United States Patent
Hofman

(10) Patent No.: US 7,812,617 B2
(45) Date of Patent: Oct. 12, 2010

(54) SYSTEM AND METHOD FOR DETECTING AND LOCATING FAULTS IN ELECTRONIC COMMUNICATION BUS SYSTEMS

(75) Inventor: Ofer Hofman, Timrat (IL)

(73) Assignee: Sital Technology & HW Design 1997 Ltd., Timrat (IL)

( * ) Notice: Subject to any disclaimer, the term of this patent is extended or adjusted under 35 U.S.C. 154(b) by 303 days.

(21) Appl. No.: 11/822,583

(22) Filed: Jul. 9, 2007

(65) Prior Publication Data

US 2008/0043629 A1 Feb. 21, 2008

Related U.S. Application Data

(60) Provisional application No. 60/818,774, filed on Jul. 7, 2006.

(51) Int. Cl.
*G01R 27/04* (2006.01)

(52) U.S. Cl. .................. 324/639; 324/533; 370/242; 702/59

(58) Field of Classification Search ................. 324/639
See application file for complete search history.

(56) References Cited

U.S. PATENT DOCUMENTS

| | | | |
|---|---|---|---|
| 4,766,549 A * | 8/1988 | Schweitzer et al. | 702/59 |
| 6,600,723 B1 * | 7/2003 | Reeb et al. | 370/245 |
| 7,282,922 B2 * | 10/2007 | Lo et al. | 324/534 |
| 2002/0097182 A1 * | 7/2002 | Goren et al. | 342/357.07 |
| 2005/0152487 A1 * | 7/2005 | Reichard | 375/350 |

FOREIGN PATENT DOCUMENTS

EP 964256 A1 * 12/1999

* cited by examiner

*Primary Examiner*—Timothy J Dole
*Assistant Examiner*—Benjamin M Baldridge
(74) *Attorney, Agent, or Firm*—Pearl Cohen Zedek Latzer, LLP

(57) ABSTRACT

System and method for detecting a fault in a faulty network element of a bus network comprising two or more transmitters. The method comprises transmitting from one of the transmitter a signal of predetermined parameters to the bus network; receiving the signal; and determining if the first signal is followed by a tail that is an echo indicative of a faulty network element. The location of the faulty network element can be determined by transmitting from a second transmitter a second signal of predetermined parameters to the bus network; the second signal and, determining if the second signal is followed by a second tail that is an echo indicative of the faulty network element; and if tails are detected, determining by an algorithm executer the location of the faulty network element by triangulation.

9 Claims, 13 Drawing Sheets

SYSTEM AND METHOD FOR DETECTING AND LOCATING FAULTS IN ELECTRONIC COMMUNICATION BUS SYSTEMS

CROSS REFERENCE TO RELATED APPLICATIONS

This application claims the benefit of U.S. Provisional Patent Application No. 60/818,774, filed on Jul. 7, 2006, which is incorporated in its entirety herein by reference.

FIELD OF THE INVENTION

The present invention relates to electronic communication bus systems. More particularly, the present invention relates to system and method for detecting and locating faults in electronic communication bus systems.

BACKGROUND OF THE INVENTION

Time Domain Reflectometry (TDR) is a well-known technique for pinpoint cabling problems. TDR systems are used to determine the distance from the measuring system to the cable problem by transmitting an electronic pulse and counting the time until an echo is reflected from the cabling problem. From the time measurement, and the known speed of the signal, the TDR derives an actual distance.

TDR systems are good for use in a single (dimension) cable, but if the cable is split in several ways, thus said to be a two-dimension network, the location of the fault could be in a number of places.

In order to use a TDR system the normal data transfer of the cable need to be disconnected and specific TDR signals introduce electronic pulses that measure distance.

The present invention pin points the location of a fault in a two-dimension network, and uses the normal transmitted signals to do that without interfering the normal operation of the network.

BRIEF DESCRIPTION OF THE INVENTION

There is thus provided, in accordance with some preferred embodiments of the present invention, a method for detecting a fault in a faulty network element of a bus network comprising two or more transmitters, the method comprising: transmitting from a first transmitter of said two or more transmitters a first signal of predetermined parameters to the bus network; receiving by at least one receiver the first signal; and determining if the first signal is followed by a first tail that is an echo indicative of a faulty network element.

Furthermore, according to some preferred embodiments of the present invention, the method further comprises: transmitting from a second transmitter of said two or more transmitters a second signal of predetermined parameters to the bus network; receiving by said at least one receiver the second signal and, determining if the second signal is followed by a second tail that is an echo indicative of the faulty network element; and if tails are detected, determining by an algorithm executer the location of the faulty network element by triangulation.

Furthermore, according to some preferred embodiments of the present invention, the bus network comprises more than two transmitters.

Furthermore, according to some preferred embodiments of the present invention, one of the transmitters is also the receiver.

Furthermore, according to some preferred embodiments of the present invention, said at least one receiver is a passive unit.

Furthermore, according to some preferred embodiments of the present invention, the method further comprises classifying the nature of the fault in the faulty bus element by determining the polarity of each of the tails.

Furthermore, according to some preferred embodiments of the present invention, the method further comprises performing the method steps over a period of time and registering detection of faults and location of the faults.

Furthermore, according to some preferred embodiments of the present invention, said at least one receiver comprises two or more receivers.

Furthermore, according to some preferred embodiments of the present invention, there is provided a system for detecting a fault in a faulty network element of a bus network comprising two or more transmitters, the system comprising: a receiver for receiving a first signal of predetermined parameters transmitted to the bus network from a first transmitter of said two or more transmitters, and for determining if the first signal is followed by a first tail that is an echo indicative of a faulty network element.

Furthermore, according to some preferred embodiments of the present invention, the system further comprises an algorithm executer, wherein the receiver is also adapted for receiving a second signal of predetermined parameters transmitted to the bus network from a second transmitter of said two or more transmitters and for determining if the second signal is followed by a second tail that is an echo indicative of the faulty network element; and if tails are detected, determining, by the algorithm executer, the location of the faulty network element by triangulation.

Furthermore, according to some preferred embodiments of the present invention, the bus network comprises more than two transmitters.

Furthermore, according to some preferred embodiments of the present invention, said at least one receiver is incorporated in one of the transmitters.

Furthermore, according to some preferred embodiments of the present invention, said at least one receiver is a passive unit.

DETAILED DESCRIPTION OF PREFERRED EMBODIMENTS

Figure 1:
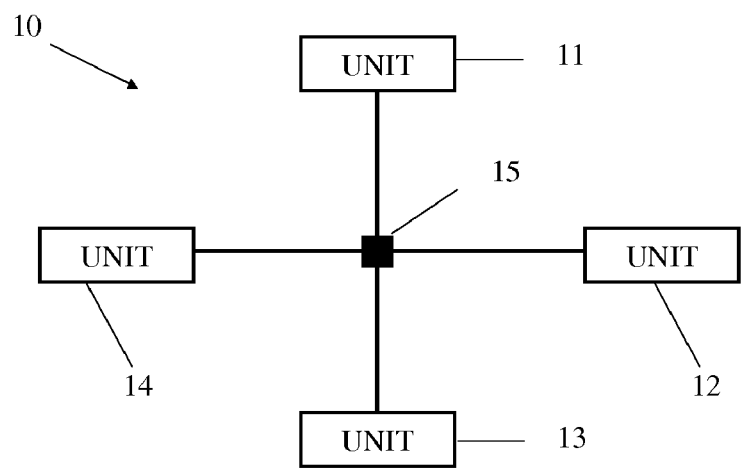
FIG. 1 illustrates a system for detecting and location faults in a bus system, according to a preferred embodiment of the present invention.

An electronic network bus, (hereinafter "bus") is a network topology that uses a common electric wires pathway between all units. Not all the units have to interchange data among themselves, yet when one unit sends information on the bus, to all the devices receive this data. FIG. 1 shows a network (10) connecting four units (11, 12, 13, 14).

Electronic systems, such as avionics systems, fulfill their mission by performing repeatedly data interchange between electronic units. Each electronic unit may contribute its findings to other units by transmitting its data.

Older systems had dedicated electronic wires to connect each unit with the other units in need of that data. As systems grew in size, wiring became big and complex. Electronic buses were developed to reduce the number of wires in those systems.

In most buses at a particular time T, only one unit can transmit data to other units because the electronic wires can have only one electronic value at a given time. As a result these buses need rules that make sure only one unit transmits data to the bus at a particular time.

Typically buses are either time division multiplexed, which means that the time axis is divided into time slots, and each time slot is dedicated to the transmission of a different unit, or use carrier sense, meaning that a unit, prior to transmitting data to the bus, must sense if no other unit is transmitting at the same time.

The bus is physically built of bus network elements. The prime bus network element is the electronic wires. The wire's physical structure presents a typical impedance for a transmitter that transmits electronic waves on to the wires. The transmitter's output signal magnitude is derived from the wire's input impedance.

The electronic signal in the electric wire may travel rapidly, for example, up to or close to the speed of light.

When the transmitted signal reaches the end of the wire, which typically is a unit, the input impedance of that unit may match the wire's impedance to absorb substantially all the signal's energy. This phenomenon is called coupling. If the impedance does not match, some of the signal's energy that is not absorbed is bounced back, presenting a coupling problem.

If more than two units are connected to a bus, a bus split has to be designed such that signal coupling is maintained (FIG. 1, item 15). This split is a network element and is typically referred to as a coupler. These couplers balance the impedance such that an electronic signal coming from one of the branches splits into all other branches and experiences matched impedance.

Figure 2:
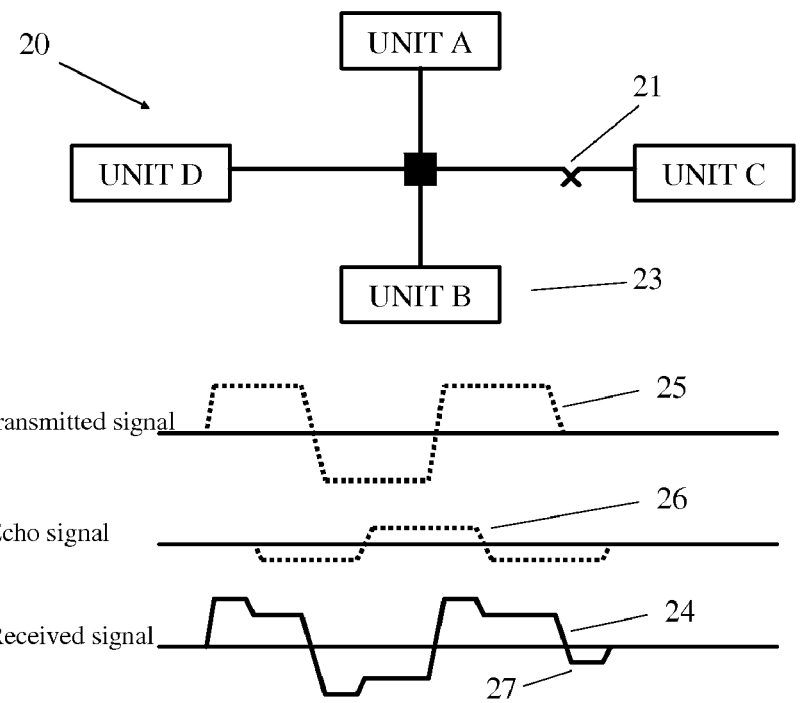
FIG. 2 illustrates a system with a fault, and the distortion of the signals from the ideal waveform received by one of the units according to embodiments of the present invention.

FIG. 2 depicts a bus fault 21. Bus faults could occur to any of the bus elements in system 20, and can be attributed to wire disconnections, coupling failures, and connector's degraded connections.

Buses, especially for automotive, military and space uses, suffer from extreme usage conditions that can produce any of the above bus elements faults.

A bus fault may have a direct effect on impedance. A bus wire cut, for example, may present infinite impedance to the signal that impinges into it. The arrived signal has no other option but to return back to the transmitter. This signal return should not have occurred had the wire been intact. This signal return can be viewed as a transmission of a new transmitter on the bus. That, in turn, makes two transmitters, the unit that transmits to the bus along with the echo that bounces back from the bus fault.

The echo is the same data as transmitted by the transmitter, but delayed in time. The amount of delay depends on the distance between the transmitter, the bus element fault and the speed of light.

Wires short circuited or open circuited present zero and infinite impedance, respectively, but other bus element fault would present impedance different from the non-fault, or typical impedance in the range between these two extremes. For example humidity between the wires could be seen as a resistor in parallel to the wire's impedance, thereby lowering its impedance. Bad contacts on a connector could be measured as a resistor in series thus presenting higher impedance than the typical impedance.

Any bus fault has its affect on the bus impedance, thus the fault acts effectively as a transmitter transmitting a delayed signal. The amplitude of that echo transmitter depends on how much that faulty impedance is different from the wire's impedance. The polarity of echo signal is also determined by the fault's impedance. If that impedance is lower than the typical impedance, the polarity of the echo would be opposite of the polarity of the transmitted signal, otherwise it would match the polarity of the transmitted signal.

All units connected to the bus network receive both the transmitted signal and the echo. FIG. 2 illustrates an example of a received signal 24, and the signals that created this signal as received by unit 23. The transmitted signal 25, and the echo signal 26.

Unit 23 may receive signal 24. This unit could either be a receiver and transmitter or a passive unit that is only a receiver.

The method for detecting and locating faults in electronic communication bus systems presented by this invention requires a receiver to monitor the transmitted signals unlike a TDR system which transmits and receives its own transmission's echoes.

Most systems that communicate over a bus network perform functional testing to verify proper bus functionality. The functional testing is usually a test that verifies that the units can receive and transmit to the bus. These tests are usually performed after the systems powers up or upon an operator request. Functional testing may most likely have a go/no-go result.

If the bus has some damage that forces a marginal bus condition that does not impair functionality, the tested bus would pass. This marginal condition could easily impair functionality when the bus is introduced to field conditions. This behavior, for example, might create single event failures which are much more difficult to detect than constant functional failure.

In a perfect bus coupling condition the receiver unit (or a passive receiver that is not one of the transmitters) that is listening to a transmitter unit, receives the transmitter's message as transmitted. Actually, that transmission is spread to all bus units. Since the units, wires and couplers are in perfect condition, the loads absorb the energy that arrives and no echo is produced.

When there is a bus fault somewhere in the bus topology (FIG. 2, item 21) part of the energy bounces back and is transmitted back to all other units. The receiver receives the original transmission, plus that echo skewed in time by the extra distance from the transmitter to the damage and from there to the receiver.

The echo is assumed to be of lower amplitude than the original transmission. Assuming the receiver accepts the original transmission and assuming it knows when the original transmission starts and ends due to its adherence to bus standard, the receiver can measure the signal that is left on the bus after the ideal transmission length. That left over echo is referred to as "tail" (FIG. 2, item 27). The length of the tail is proportional to the extra distance between the transmitter, the damage and to the receiver.

Each transmitting unit is located at a different distance from a given bus fault that changes the coupling thus each unit's transmission would have a different tail length for a given bus fault.

Figure 3:
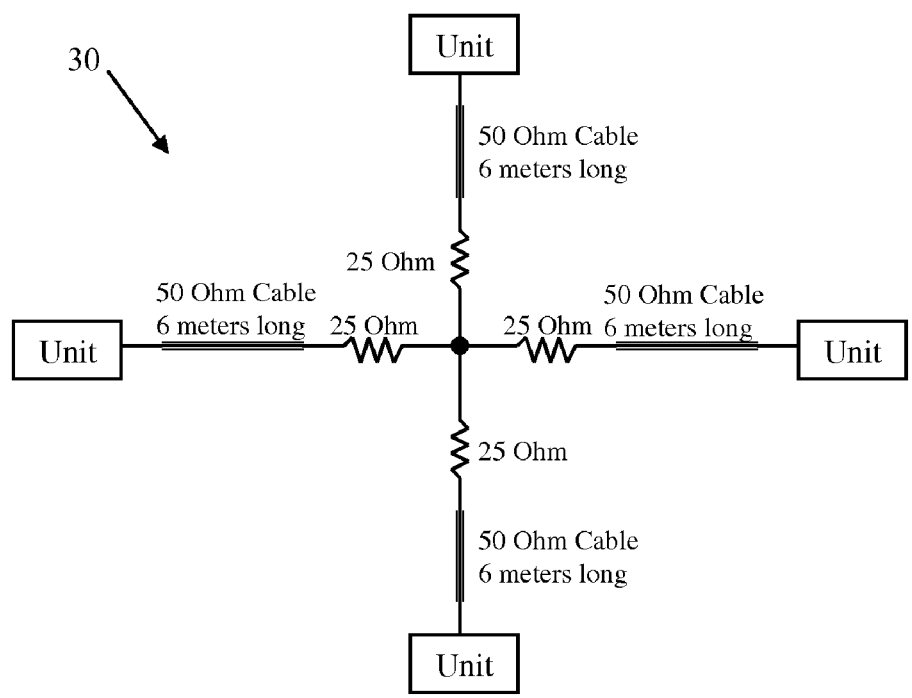
FIG. 3 illustrates a simulation constellation (30) of a system with a single transmitter and three receivers, well coupled, and with no bus faults, according to embodiments of the present invention.

FIG. 3 illustrates a simulation constellation of a system (30) with a single transmitter and three receivers, well coupled, and with no bus faults, according to embodiments of the present invention.

Figure 4:
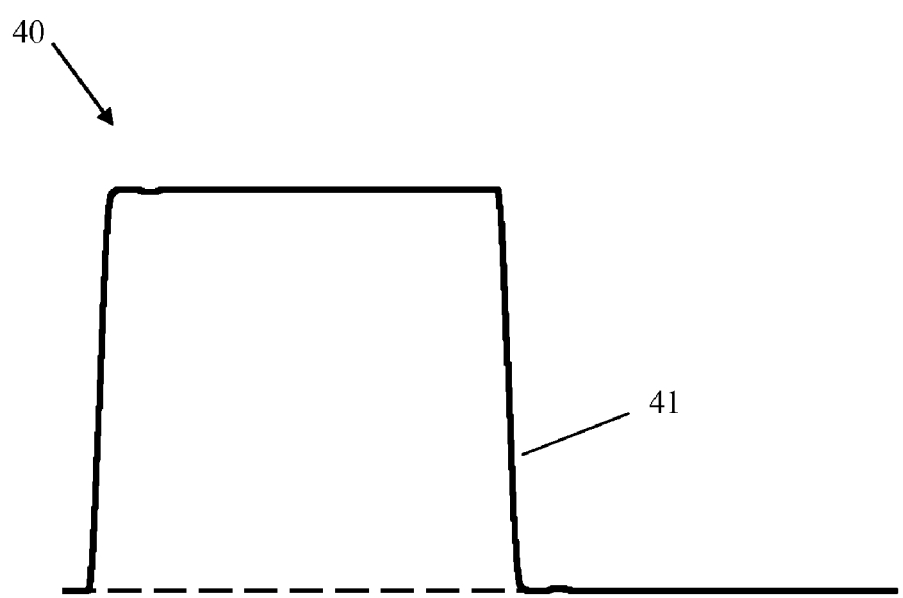
FIG. 4 illustrates the detected signal (40, with an end 41 without a tail) at the center of the simulation constellation of FIG. 3 according to embodiments of the present invention.

FIG. 4 illustrates the detected signal (40, with an end 41 without a tail) at the center of the simulation constellation of FIG. 3 according to embodiments of the present invention.

Figure 5:
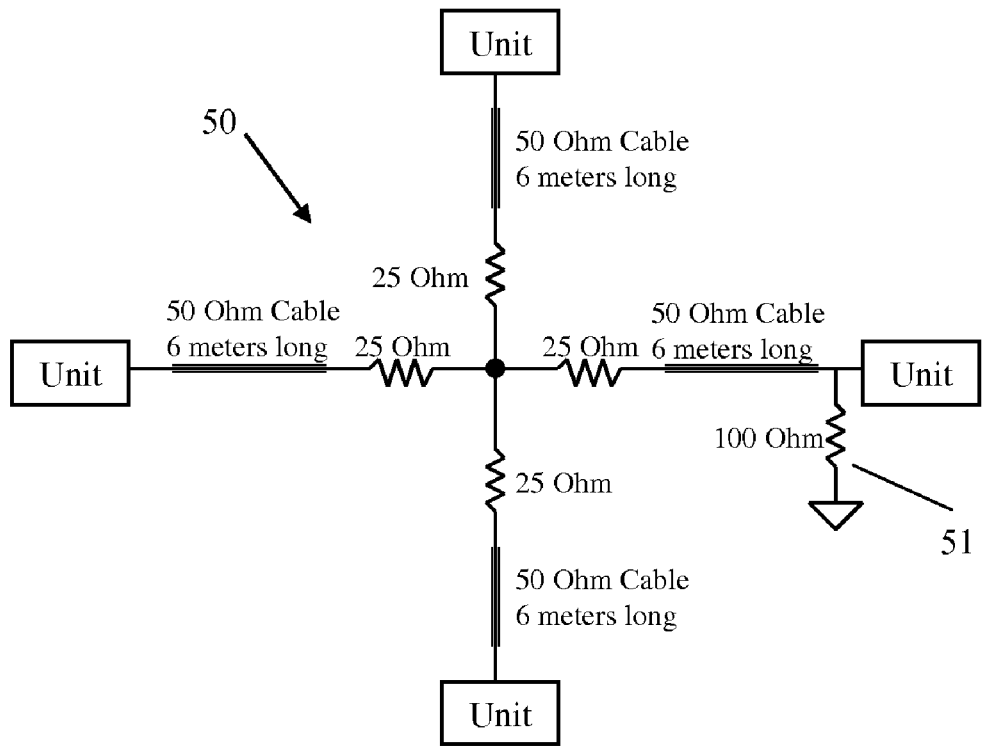
FIG. 5 illustrates a simulation constellation (50) of a system presented in FIG. 3, with an over load fault (51) at the input of one of the receivers according to embodiments of the present invention.

FIG. 5 illustrates a simulation constellation (50) of a system presented in FIG. 3, with an over load fault (51) at the input of one of the receivers according to embodiments of the present invention.

Figure 6:
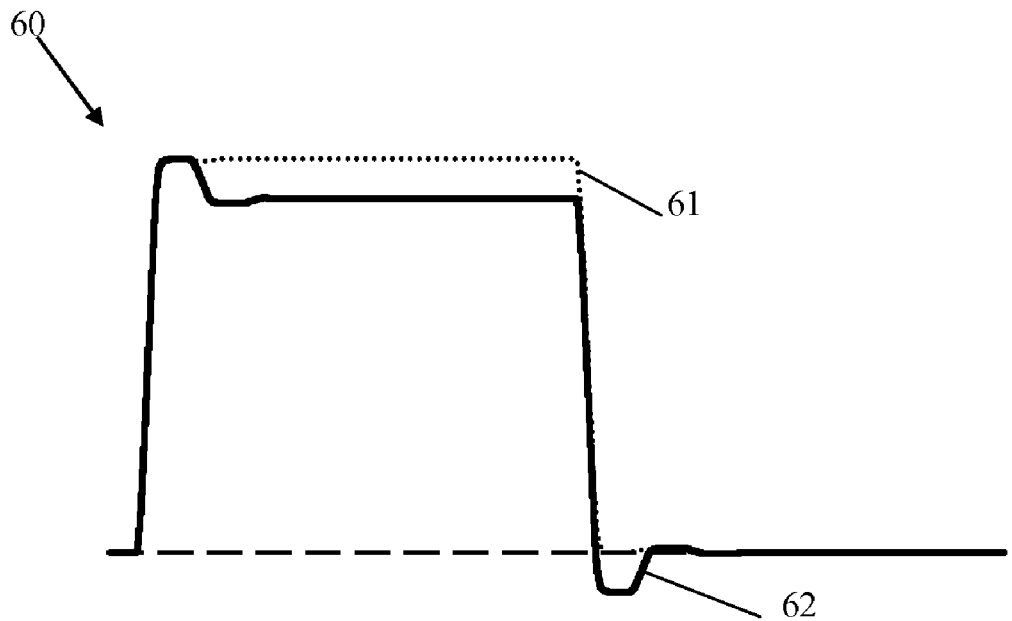
FIG. 6 illustrates the detected signal (60) at the center of the simulation constellation of FIG. 5, showing the tail (62) created by the unbalanced coupling (compared with the ideal signal 61)

FIG. 6 illustrates the detected signal (60) at the center of the simulation constellation of FIG. 5, showing the tail (62) created by the unbalanced coupling (compared with the ideal signal 61).

Figure 7:
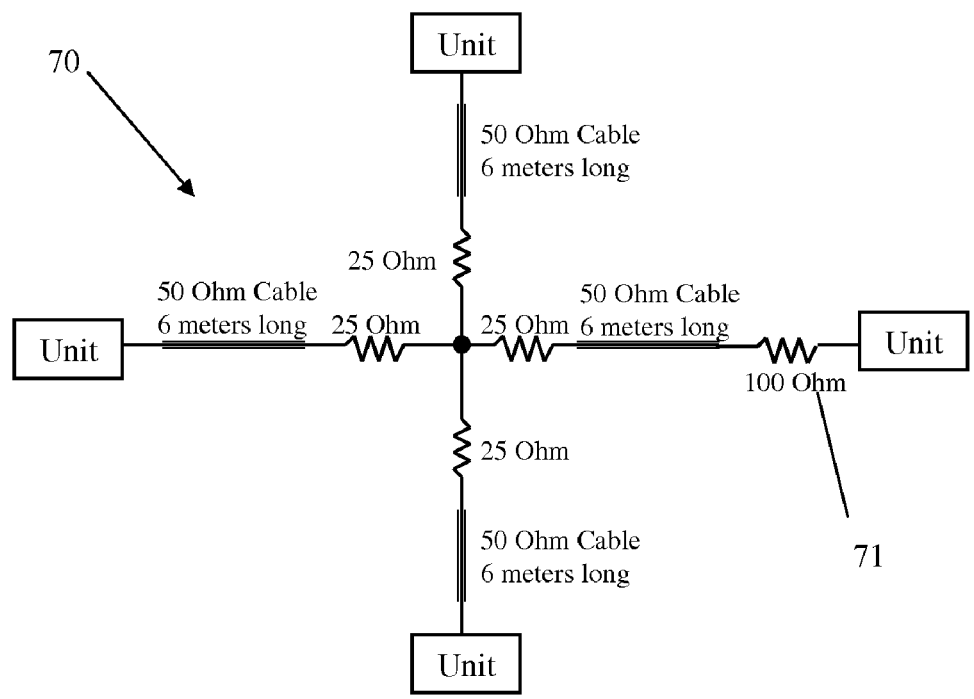
FIG. 7 illustrates a simulation constellation (70) of a system presented in FIG. 3, with an under load fault (71) at the input of one of the receivers.

FIG. 7 illustrates a simulation constellation (70) of a system presented in FIG. 3, with an under load fault (71) at the input of one of the receivers.

Figure 8:
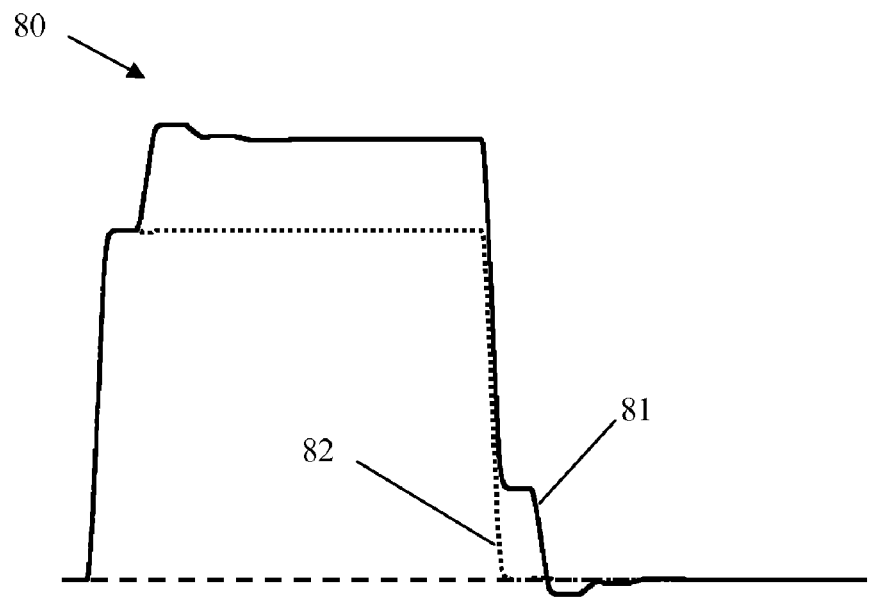
FIG. 8 illustrates the detected signal (80) at the center of the simulation constellation of FIG. 7, showing the tail (81) created by the unbalanced coupling compared with the ideal signal (82).

FIG. 8 illustrates the detected signal (80) at the center of the simulation constellation of FIG. 7, showing the tail (81) created by the unbalanced coupling compared with the ideal signal (82).

The receiver on the bus measures the tail from all of the transmitters; this receiver can hold a list of all tail lengths. In perfect bus condition this list should be all zeros because no tails are created. However, once the bus is damaged somewhere in the bus topology, a non-zero list is produced.

The elementary detection of a tail list values change indicates the existence of a bus fault. For many applications, just reporting a tail list value change, can indicate to maintenance personal that communication failures occurred because of bus faults rather than unit failures. Furthermore, analyzing the tails list with triangulation calculation can pinpoint an exact bus failure.

By performing a triangulation calculation, it is possible to determine the exact location of the faulty network element. In the context of the present invention, triangulation is generally used to refer to a method for pin-pointing a specific location on the bus where the damaged bus element is. In one embodiment of the invention, the triangulation procedure may be: (a) for each transmitter's tail in the list, calculate a distance (based on the speed of the signal) to the bus fault; (b) from that transmitter, mark all possible locations that are at the calculated distance from the transmitter; (c) repeat this procedure for all transmitters. The location of the damaged bus element may be the place where all transmitters marks coincided.

In some embodiments of the invention, the tail list update should be done continuously, however the triangulation calculation could be done off-line when the system is brought for repair.

In some embodiments of the invention, there may be more than one receiver that tracks the tails, thus enhancing the pinpoint capabilities and accuracy.

In some embodiments of the invention, the receiver tracking the tails may be part of the transmitter unit since units that transmit typically have a receiver for the network information.

A simulation example list of tail lengths measured at center coupler of the bus shown in FIG. 2 is given in the table below:

| Unit name | Perfect bus | C bus fault | A bus fault | D bus fault |
|---|---|---|---|---|
| A | 0 ns | 50 ns | 10 ns | 50 ns |
| B | 0 ns | 50 ns | 50 ns | 50 ns |
| C | 0 ns | 10 ns | 50 ns | 50 ns |
| D | 0 ns | 50 ns | 50 ns | 10 ns |

Let Li be a receiver unit that composes a "Tails Code Key" by measuring the tail of all units on the bus.

Let Ln (Length n) be the distance between unit n and the Li.

Let E1n (Error1 n) be the distance between unit n and a bus fault.

Let E2n (Error2 n) be the distance between a bus fault and Li.

Let Dn (Delta n) be Dn=(E1n+E2n)−Ln.

Let TDn (Time Delta n) be the length of the tail for unit n. TDn=Dn/(4/5*C). Distance divided by 4/5 speed of light.

Let K1 . . . N (Key 1 to n) be a set of time figures: K1 . . . N=TD1, TD2, TD3 . . . TDn. K1 . . . N is a list of tail lengths in seconds for all units.

For an ideal bus, K1 . . . N=(0, 0, 0, . . . 0)

For each bus fault positioned in a unique place on the bus a unique, non-zero K1 . . . N is measured by Li.

According to a preferred embodiment of the present invention, one of the units on the bus, called "Algorithm Executor" (AE) is able to measure the tails of all units on the bus. This unit maintains a list of all tails. This list is the "Tails Code Key".

Since buses are not ideal, the "Tails Code Key" is expected not to be zero. The AE unit is preferably capable of performing calibration task, initiated by the system's operator, which measures the "Tails Code Key" and keeps this code as the master reference code.

During operation of the system, the AE unit constantly measures the "Tails Code Key" and checks if that code is within a tolerated distance from the reference code. When an intolerable "Tails Code Key" is measured, this code is registered.

The intolerable "Tails Code Key" is in fact a signature of a specific bus fault somewhere in the bus topology. A technician should be able to pinpoint the exact physical location of the bus fault based on the values of the "Tails Code Key".

Online knowledge databases maintain a record of all known signatures for a specific bus. Searching in that database with the measured "Tails Code Key" results in determining the location of the bus problem.

If the bus fault is not severe, bus functionality would probably persist, however, technicians could be able to locate the fault thanks to the code, and replace or repair whatever needs to be repaired before functionality is hurt.

The AE unit also records bus problems that occur only once, or occur for a limited period of time, such as when aircraft perform intense maneuvers. The recorded code defines the physical location of the problem. Technical crews get a physical location of the problem even though they cannot, and need not, reproduce the problem.

"Tails Code Key" enhances maintenance of system buses infrastructure.

"Tails Code Key" is a technology that measures bus signals that are normally considered noise and filtered out by most bus units.

"Tails Code Key" looks for the left over signal on a bus and measures it. The distances between the bus fault and the transmitters directly affect the left over signal length in time. "Tails Code Key" produces a list of tails from various transmitters on the bus, and derived from that list, a precise geometrically location of the bus fault can be found.

By comparing the list of tail lengths to a reference list of a particular bus, a system implementing "Tails Code Key" technology would be able to warn about a bus problem before it fails functionality, deliver a physical location of that problem on the bus even if it happened only once during the operation of the system.

We now include simulation results of a bus. Simulations were performed on Mentor Graphics Hyperlynx LineSim signal integrity simulation tool Version 7.7.

The bus was built from 4 units that are connected with 6 meters bus from a central coupler. The bus topology is symmetric in all directions, to make the analysis easier to comprehend.

The bus cables are standard Z0=50 Ohm

The bus monitoring was done on the center coupler.

Each of the units, north, south, west and east, present a 50 Ohm input impedance, and matched transmitter impedance.

Figure 11:
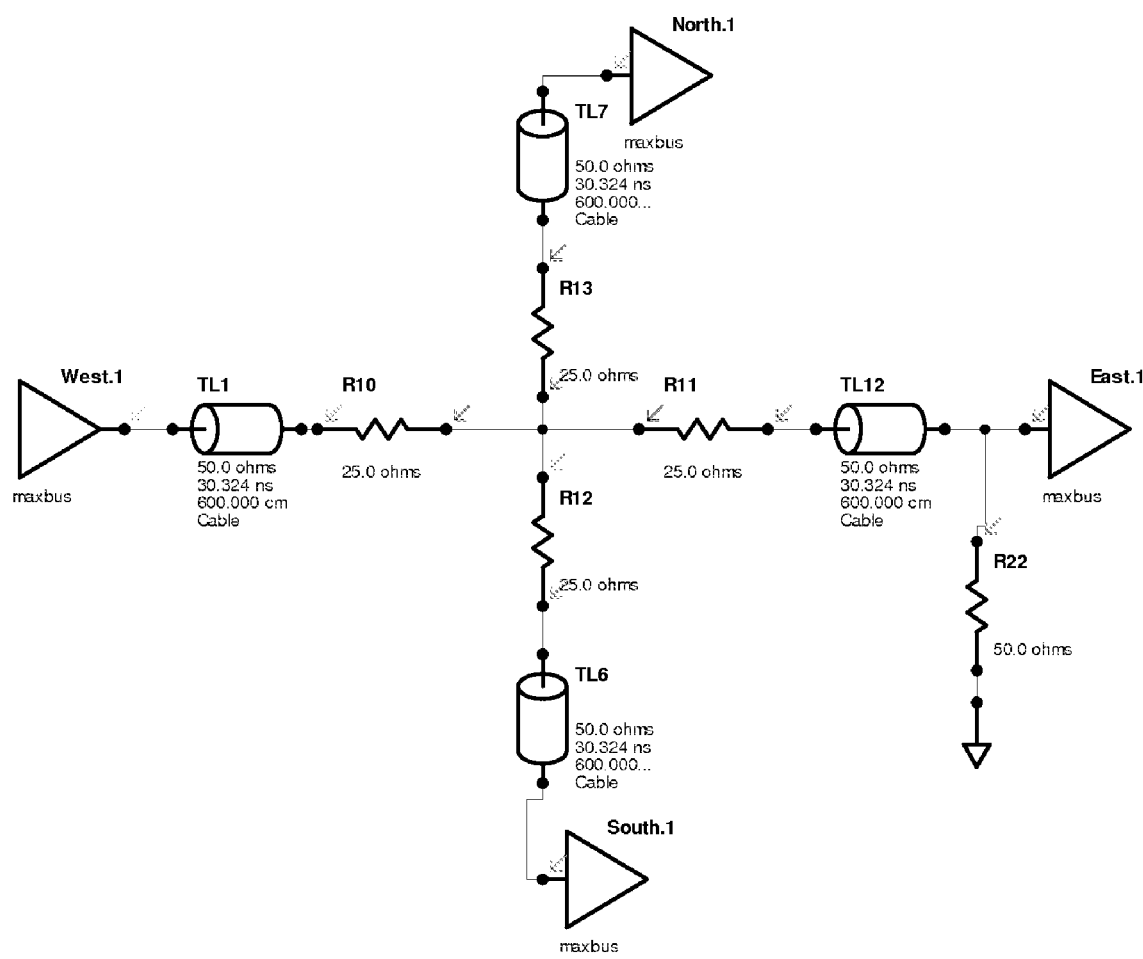
FIG. 11 illustrates the simulated bus system with a fault in the east branch.
Figure 13:
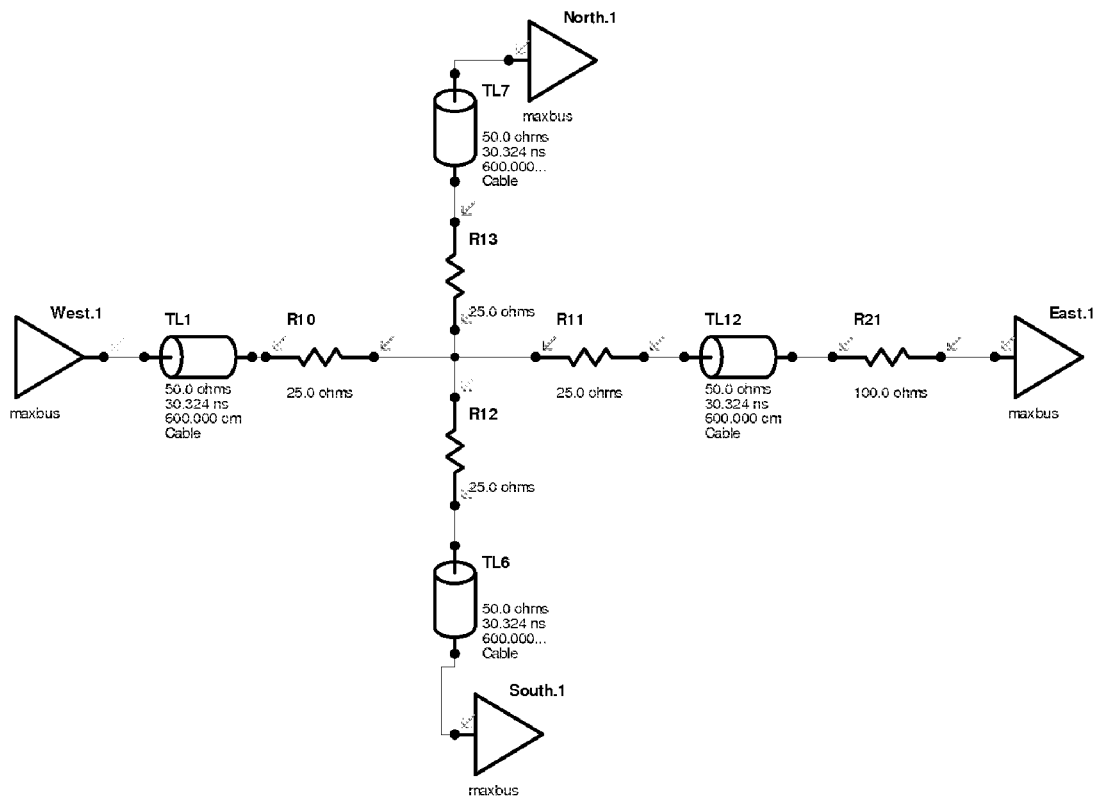
FIG. 13 illustrates the simulated bus system with a different fault in the east branch.
Figure 16:
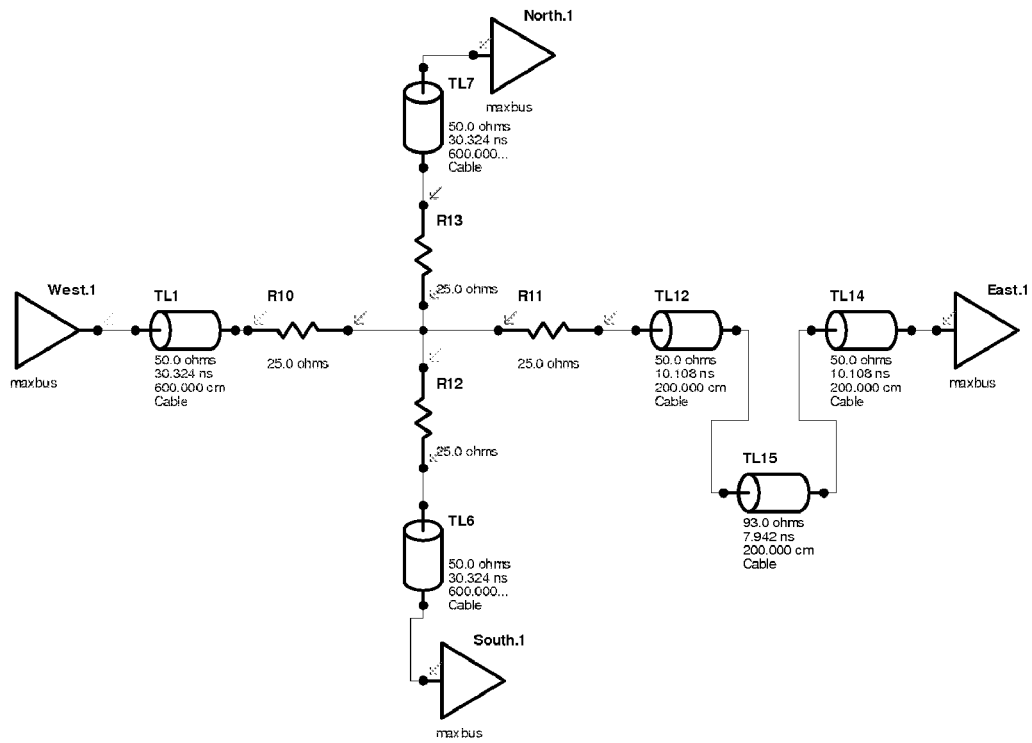
FIG. 16 illustrates the simulated bus system with yet a different fault in the east branch.

All bus faults were imposed on the east branch as shown in FIGS. 11, 13, and 16.

Figure 9:
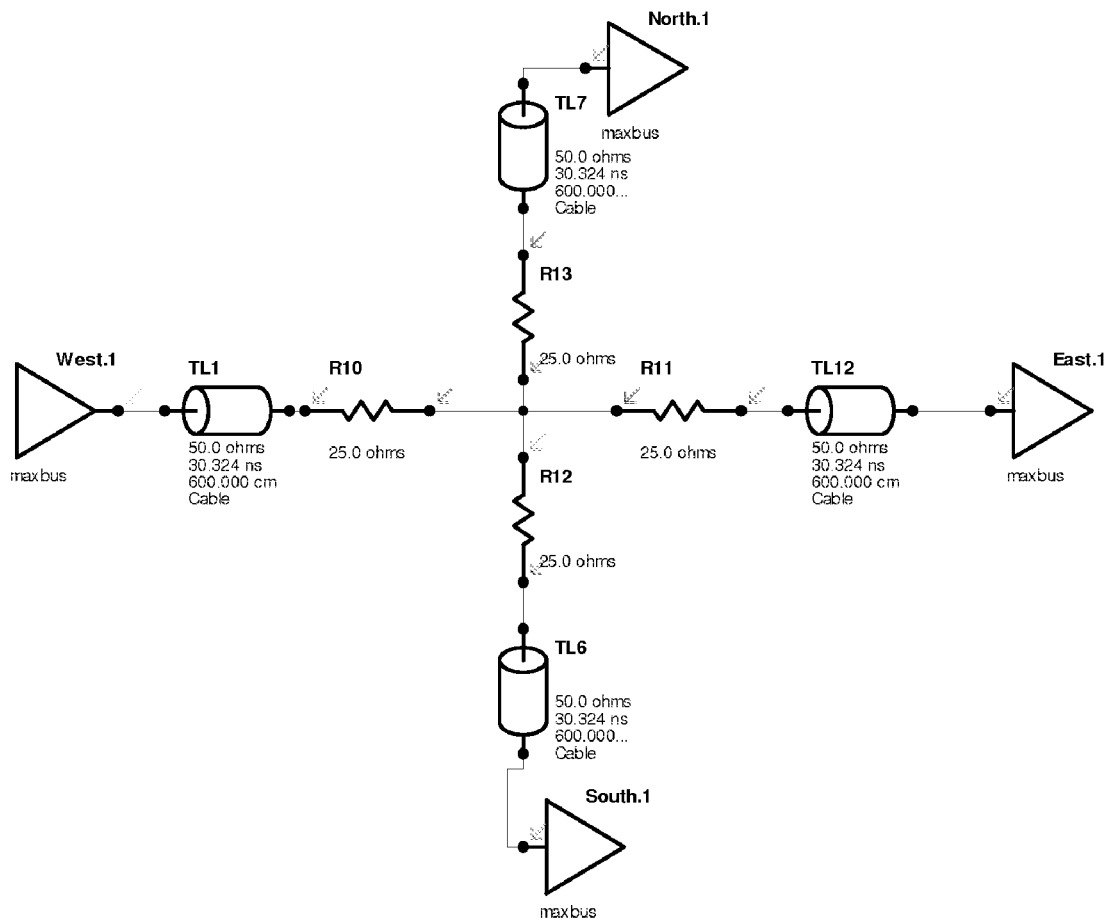
FIG. 9 illustrates a simulated bus system with ideal bus conditions.

FIG. 9 illustrates a simulated bus system with ideal bus conditions.

Figure 10:
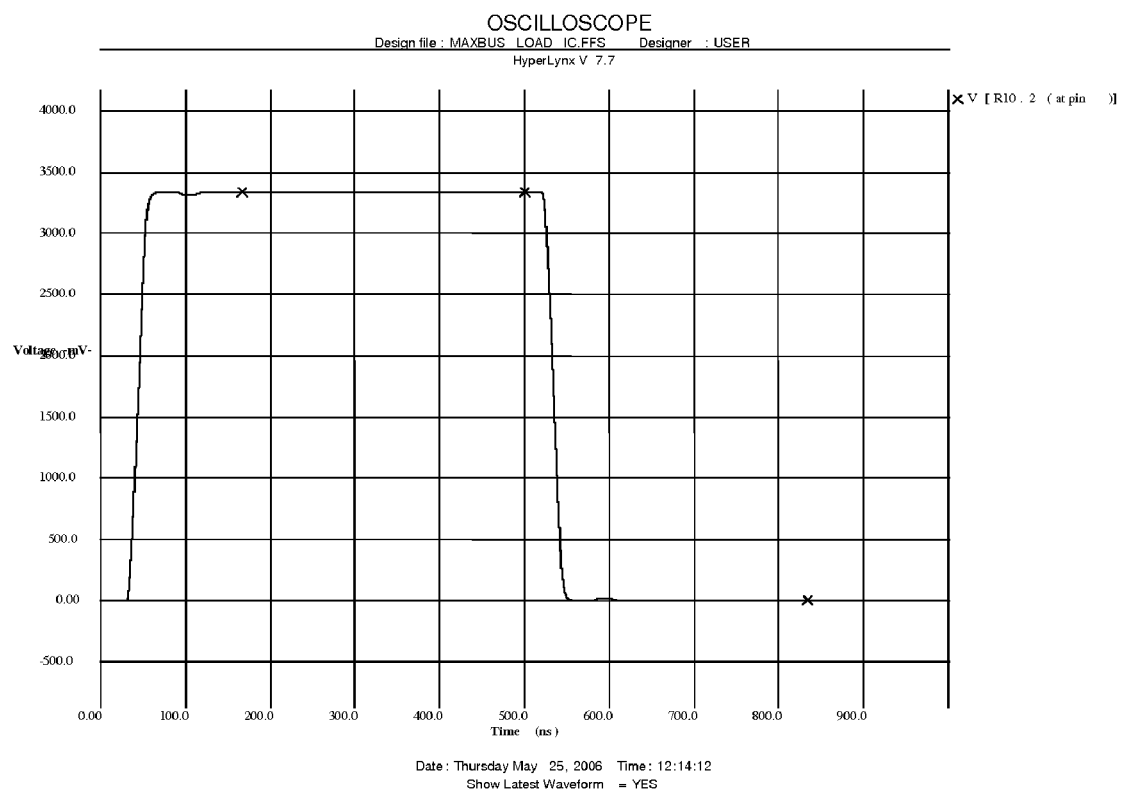
FIG. 10 illustrates a simulated oscilloscope trace of a wave as detected at the central coupler of the simulated bus system shown in FIG. 9.

FIG. 10 illustrates a simulated oscilloscope trace of a wave as detected at the coupler center under the ideal bus condition of the simulated bus system shown in FIG. 9.

Figure 12:
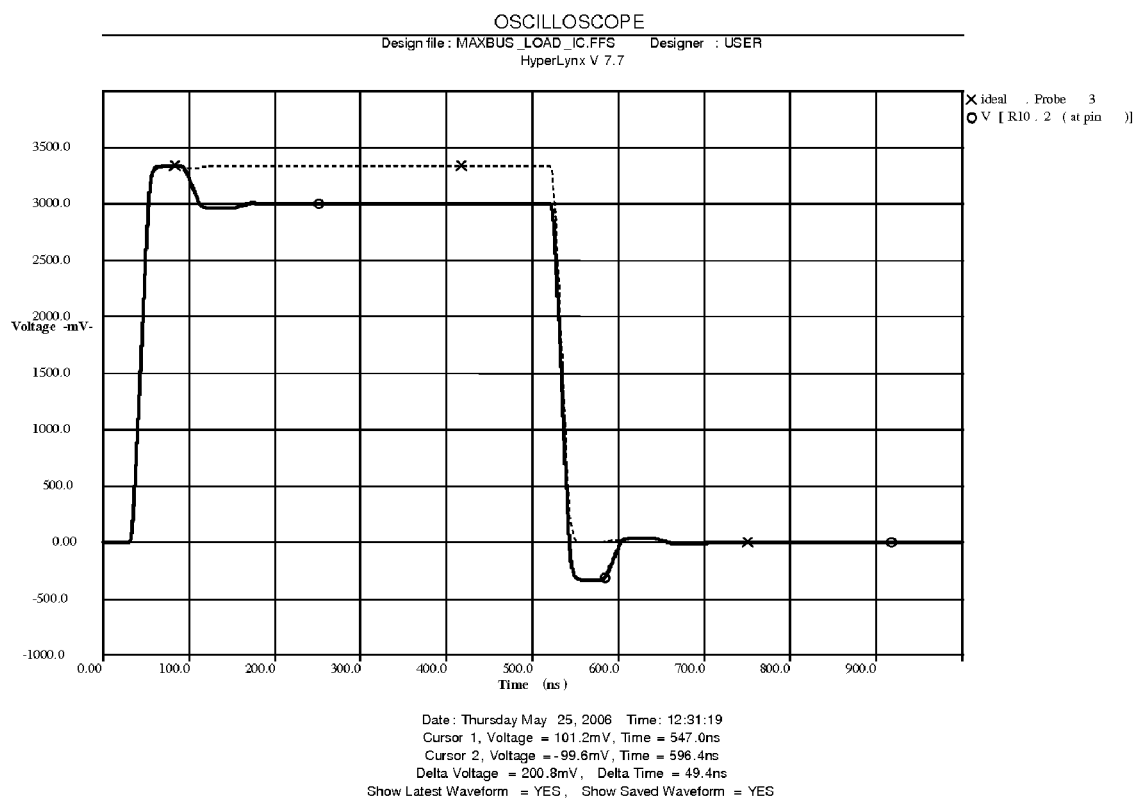
FIG. 12 illustrates a simulated oscilloscope trace of a wave as detected at the central coupler of the simulated bus system shown in FIG. 11.

FIG. 11 illustrates the simulated bus system with a fault in the east branch. The bus defect is an additional input 50-Ohm load in the connection with east unit. The input impedance is now 25 Ohm FIG. 12 illustrates a simulated oscilloscope trace of a wave as detected in the coupler center of the simulated bus system shown in FIG. 11. The dashed line is the ideal bus signal. The solid line is the signal detected when the fault is introduced.

As seen, after about 49 ns the echo signal with polarity opposite from the transmitted energy is added to the original transmission. The result is a step down in voltage at time 100 ns and at 550 ns.

The tail is the energy that exists on the line from the ideal end point at about 550 ns, and stays at the same negative value for 49 ns (until 600 ns).

In this simulation the bus fault's impedance (25 Ohm) is lower than the wire's impedance (50 Ohm), thus the echo is of opposite polarity of the original transmission.

The length of the tail is ~50 ns, and is due to a fault with a 12 meter (6 m+6 m) extra travel distance. The speed of the signal is 4/5 speed of light.

When the east unit transmits, the bus fault 50-Ohm impedance lowers the signal that goes to the bus, but does not create any echo because the rest of the bus is well coupled.

The "Tails Code Key" for this fault is 49 ns tail length for north, south, and west units, but 0 ns for east unit. So the fault is 12 meters/2 away from north, south, and west, but 0 meters from east unit.

Figure 14:
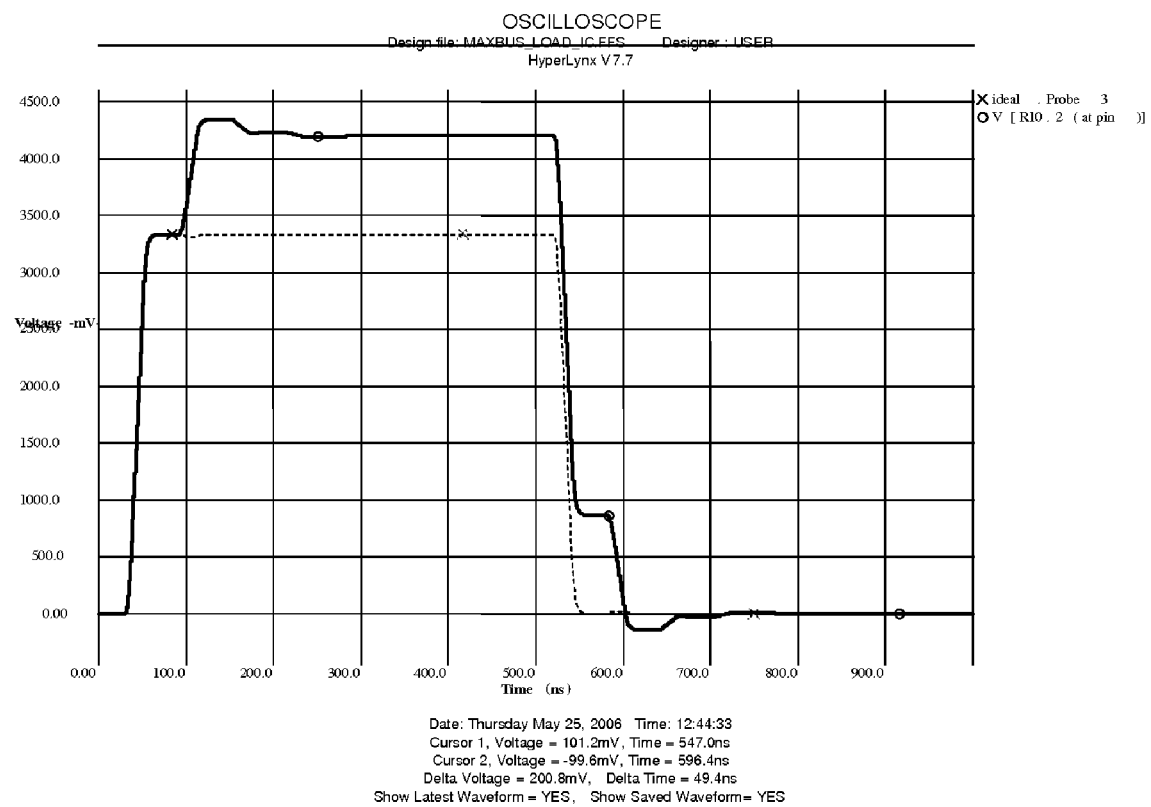
FIG. 14 illustrates a simulated oscilloscope trace of a wave as detected at the central coupler of the simulated bus system shown in FIG. 13.

FIG. 13 illustrates the simulated bus system with a different fault in the east branch. The bus defect is an additional serial resistor of 100 Ohm in the connection with the east unit. The input impedance is now 150 Ohm FIG. 14 illustrates a simulated oscilloscope trace of a wave as detected at the central coupler of the simulated bus system shown in FIG. 13. The dashed line is the ideal bus signal. The solid line is the signal detected when the east resistance is higher.

As seen, after about 49 ns the echo signal with polarity equal to the transmitted energy is added to the original transmission. The result is a step up in voltage in both time 100 ns and in 550 ns.

The tail is the energy that exists on the line from the ideal end point at about 550 ns, and stays at the same positive value for 49 ns (until 600 ns).

In this simulation the bus fault's load (150 Ohm) is higher than the wire's impedance (50 Ohm), thus the echo is of the same polarity of the original transmission.

The length of the tail is ~50 ns, and is due to a fault with a 12 meter (6 m+6 m) extra travel distance.

Figure 15:
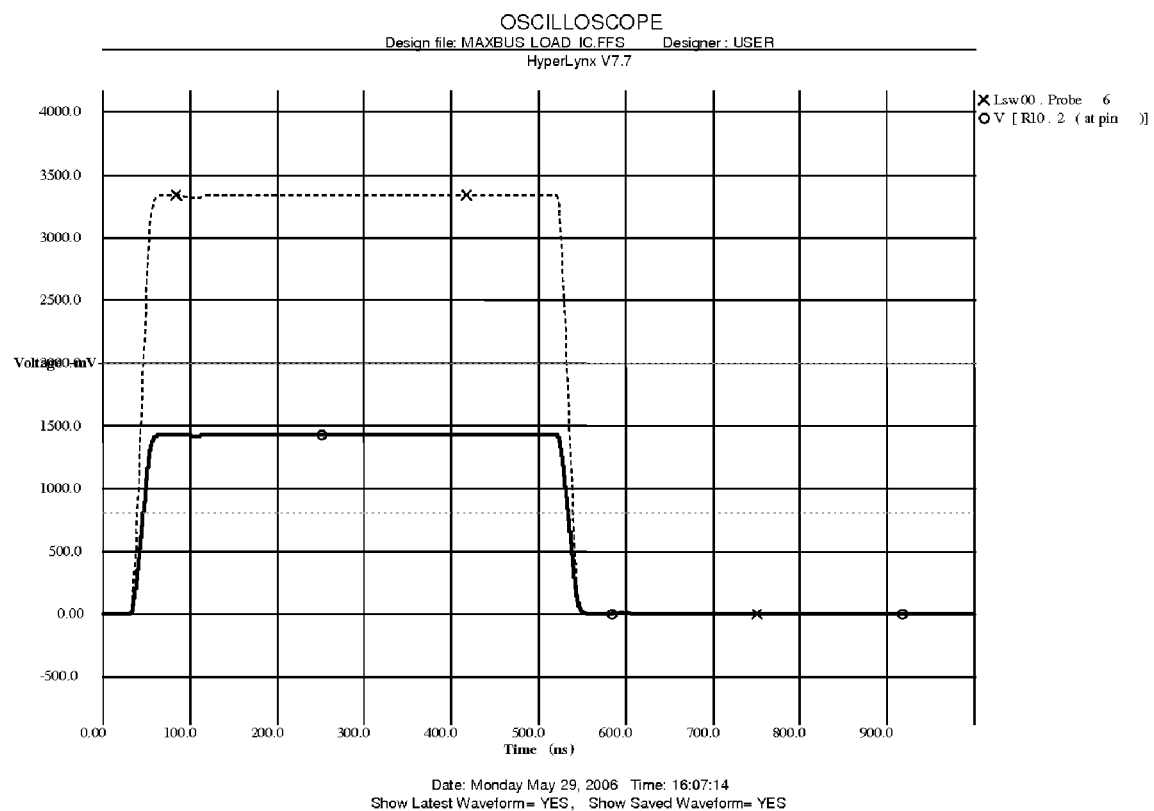
FIG. 15 illustrates a simulated oscilloscope trace of a wave as detected at the central coupler of the simulated bus system shown in FIG. 13, when the east unit transmits.

FIG. 15 illustrates a simulated oscilloscope trace of a wave as detected at the central coupler of the simulated bus system shown in FIG. 13, when the east unit transmits. When the east unit transmits, the bus fault 100-Ohm serial resistance lowers the signal that goes to the bus, but does not create any echo because the remainder of the bus is well coupled.

The "Tails Code Key" for this fault is 49 ns tail length for the north, south, and West units, but 0 ns for the east unit. So the fault is 12 meters/2 away from north, south, and west, but 0 meters from the east unit.

FIG. 16 illustrates the simulated bus system with yet a different fault in the east branch. The bus defect is 2 meters of the wrong cable (Z0=93 Ohm) after 2 meters of correct (matched) cable, and after it, an additional 2 meters of correct cable. This fault represents a bad or damaged cable.

Figure 17:
FIG. 17 illustrates a simulated oscilloscope trace of a wave as detected at the central coupler of the simulated bus system shown in FIG. 16.

FIG. 17 illustrates a simulated oscilloscope trace of a wave as detected at the coupler center of the simulated bus system shown in FIG. 16. The dashed line is the ideal bus signal. The solid line is the signal detected when the east cable is faulty.

As seen, the cables now present a higher resistance than the 50-Ohm, thus the signal rises above the ideal (dashed) signal. However that extra signal reaches the east unit's 50-Ohm load that sends an echo back with inverse polarity. The resulting signal measured on the bus is a tail of about 30 ns with inverse polarity is seen on the bus.

Figure 18:
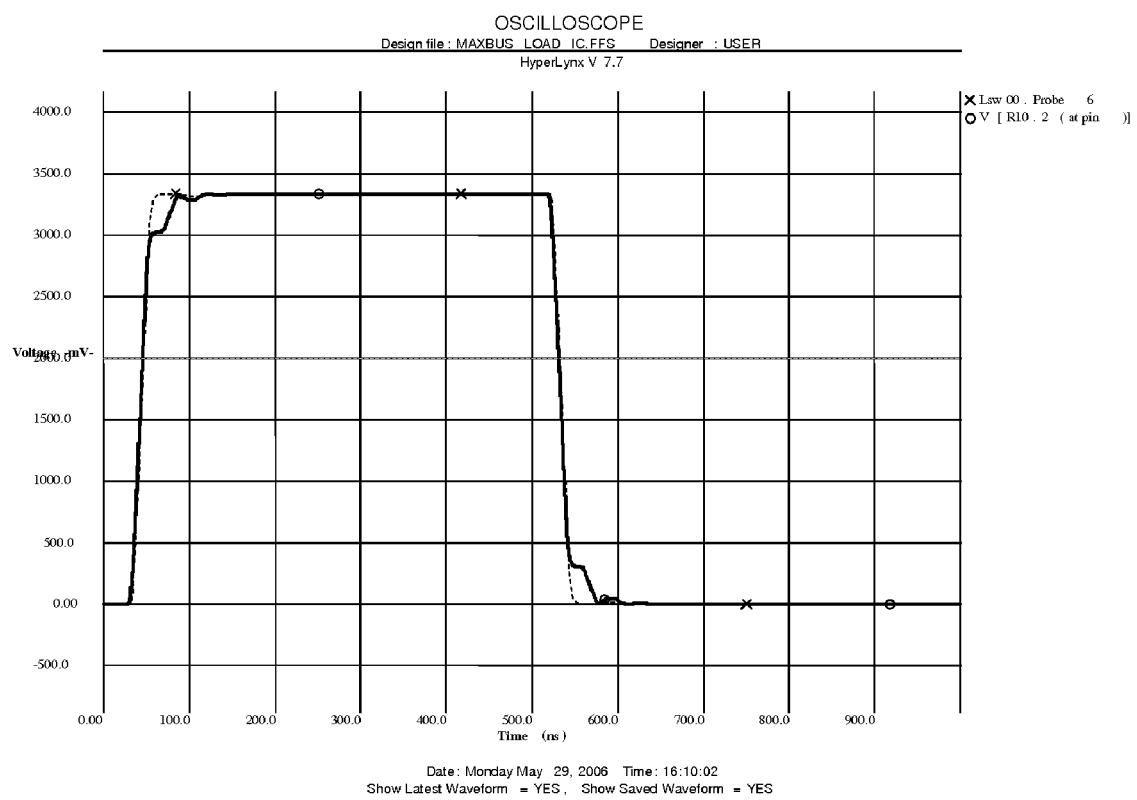
FIG. 18 illustrates a simulated oscilloscope trace of a wave as detected at the central coupler of the simulated bus system shown in FIG. 16, when the east unit transmits.

FIG. 18 illustrates a simulated oscilloscope trace of a wave as detected at the central coupler of the simulated bus system shown in FIG. 16, when the east unit transmits. When the east unit transmits the reaction to the same bus fault is different. The same 30 ns tail is measured; however its polarity is positive value, i.e., added to the original transmitter.

The following summarizes the simulation: "Tails Code Key" found a tail of 30 ns for all transmitters because the fault is located 2 to 4 meters away from all units.

In this case "Tails Code Key" found the same lengths of tail for all to transmitters. If the same bus fault were in the west or north or south, the same "Tails Code Key" would be measured, which would be a problem. However, in most cases, buses are not symmetric as in this demo, so the "Tails Code Key" would be unique for all four faults.

If the bus is symmetric, it is possible to measure the polarity of the tail. When the fault is in the east, the east's transmission tail is in the same polarity as the original transmission, but the tail of all three other transmitters is of opposite polarity.

The medium, which is applicable for "Tails Code Key" technology, is electronic wires that connect two or more electronic units transmitting digital electronic data to other units through those wires, and one or more electronic units that receive the data.

The bus medium should be well balanced. Wires present impedance to the transmitter, this impedance must be kept at any splitter/coupler/end point otherwise echoes are produced and hurt data quality.

If more than two units are connected to the medium, proper bus splitting with load balancing, using couplers must be obeyed;

Since the bus medium is connected to all transmitters, only one transmitter can transmit its data to the bus at a given time. If more than one transmitter transmits to the bus medium, data is corrupted and useless.

What is claimed is:

1. A method for locating a faulty network element of a bus network that includes a plurality of transmitters, the method comprising:
    receiving, by at least one receiver connected to the bus network, signals of predetermined parameters which are separately transmitted by two or more transmitters of said plurality of the transmitters;
    obtaining reference tail lengths of previous signals transmitted by the two or more transmitters of said plurality of transmitters; and
    determining the distance between each of said two or more transmitters of said plurality of transmitters and the faulty network element by analyzing tails in the received signals with respect to the reference tail lengths, and performing a triangulation calculation to determine the location of the faulty network element.

2. The method of claim 1, wherein at least one of said two or more transmitters of said plurality of transmitters also comprises said at least one receiver.

3. The method of claim 1, wherein said at least one receiver is a passive unit.

4. The method of claim 1, further comprising classifying the nature of the fault in the faulty bus element by determining the polarity of each of the tails.

5. The method of claim 1, further comprising performing the method steps over a period of time and registering detection of faults and location of the faults.

6. The method of claim 1, wherein said at least one receiver comprises two or more receivers.

7. A system for locating a faulty network element of a bus network that includes a plurality of transmitters, the system comprising:
    at least one receiver connected to the bus network for receiving signals of predetermined parameters which are separately transmitted via the bus network by two or more transmitters of said plurality of transmitters, and
    an executer for determining the distance between each of said two or more transmitters of said plurality of transmitters and the faulty network element by referring to reference tail lengths of previous signals transmitted by the two or more transmitters of said plurality of transmitters, analyzing the tails in the received signals, and performing a triangulation calculation to determine the location of the faulty network element.

8. The system of claim 7, wherein at least one of said two or more transmitters of the plurality of transmitters also comprises the said at least one receiver.

9. The system of claim 7, wherein said at least one receiver is a passive unit.

* * * * *